United States Patent
Magee et al.

(10) Patent No.: US 7,496,612 B2
(45) Date of Patent: Feb. 24, 2009

(54) PREVENTION OF DATA CORRUPTION CAUSED BY XML NORMALIZATION

(75) Inventors: Matthew S. Magee, Atlanta, GA (US); Donald W. Dumitru, Bellevue, WA (US); Joel M. Soderberg, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 11/189,247

(22) Filed: Jul. 25, 2005

(65) Prior Publication Data

US 2007/0033209 A1 Feb. 8, 2007

(51) Int. Cl.
*G06F 17/30* (2006.01)

(52) U.S. Cl. ............... 707/203; 707/103 R; 707/8; 715/234; 717/116

(58) Field of Classification Search ............. 707/203, 707/103 R, 8; 345/530; 717/116; 715/234
See application file for complete search history.

(56) References Cited

U.S. PATENT DOCUMENTS

| | | | | |
|---|---|---|---|---|
| 6,088,675 | A * | 7/2000 | MacKenty et al. | 704/270 |
| 6,347,323 | B1 * | 2/2002 | Garber et al. | 707/203 |
| 6,356,920 | B1 * | 3/2002 | Vandersluis | 715/501.1 |
| 6,560,616 | B1 * | 5/2003 | Garber | 707/203 |
| 7,197,746 | B1 * | 3/2007 | Goldberg | 717/140 |
| 2002/0122057 | A1 * | 9/2002 | Maloney | 345/744 |
| 2003/0014733 | A1 * | 1/2003 | Ringseth et al. | 717/116 |
| 2003/0084078 | A1 * | 5/2003 | Torii et al. | 707/513 |
| 2003/0188039 | A1 * | 10/2003 | Liu et al. | 709/315 |
| 2005/0097178 | A1 * | 5/2005 | Bala | 709/207 |
| 2006/0274376 | A1 * | 12/2006 | Bailey et al. | 358/3.26 |
| 2007/0027670 | A1 * | 2/2007 | Verhey-Henke et al. | 704/2 |

OTHER PUBLICATIONS

Bray, T., et al. (Eds.), "Extensible markup language (XML) 1.0 (Third Edition)," *W3C Recommendation*, Feb. 4, 2004, 1-60, http://www.w3org/TR/2004/REC-xml-20040204.

Mitra, N. (Ed.), "SOAP version 1.2 Part 0: Primer," *W3C Recommendation*, Jun. 24, 2003, 1-52, http://www.w3.org/TR/2003/REC-soap12-part0-20030624.

* cited by examiner

*Primary Examiner*—Hosain T Alam
*Assistant Examiner*—Syling Yen
(74) *Attorney, Agent, or Firm*—Woodcock Washburn LLP (57) ABSTRACT

Removal of white space from XML data retrieved from a database may amount to data corruption. Yet such removal is required in XML data normalization by XML parsers, and is also frequently carried out via one or more optional parser features. Safeguards provided herein protect XML data from such normalization and white space removal when formulating a response in a database. When delivering an XML fragment in response to a client request, an XML document's white space handling rules may be ascertained. Any ignorable white space in the XML document may be discarded, and any remaining white space may be preserved.

11 Claims, 5 Drawing Sheets

Ascertain XML Document White Space Handling Rules
500

Discard All Ignorable White Space According to Rules
501

Preserve Remaining White Space
502

PREVENTION OF DATA CORRUPTION CAUSED BY XML NORMALIZATION

BACKGROUND

The Extensible Markup Language ("XML") is a markup language used to describe data. The hallmark of XML is that its tags are not predefined. XML has become a common tool for data manipulation and data transmission. The World Wide Web Consortium ("W3C") maintains authoritative XML specifications.

XML may be used as a data exchange format. For example, data of any format may be stored in a database. The database may exchange data with one or more client applications. Data from the database may be converted to XML, sent to a client application, and finally converted into some third format for use by the client. Conversely, updating the database may involve XML as an intermediate format as well.

With the rise in data exchange over networks, applications increasingly integrate features that automatically retrieve any necessary data from a network, rather than requiring a user to manually launch a browser, find the information on the network, and then use the information as he sees fit with his local applications. Automated retrieval of data from a network by applications is in some embodiments referred to as web service technology.

Applications running on a single device typically communicate using Remote Procedure Calls (RPC) between objects, such as DCOM and CORBA. RPC represents a compatibility and security problem, however, when communicating between multiple devices on a network, especially a Hyper Text Transfer Protocol ("HTTP")-based network such as the internet. Firewalls and proxy servers will block RPC traffic.

Alternative inter-application data exchange protocols may take advantage of XML as a data exchange format. One such data exchange protocol is the Simple Object Access Protocol ("SOAP"). SOAP provides a format for sending messages, and was optimized for communication via the internet. It has the advantages of being platform independent, language independent, simple and extensible, and firewall compatible. SOAP is based on XML, and like XML, authoritative SOAP specifications are maintained by the W3C.

XML and SOAP technologies thus allow modem applications to incorporate features that automatically send SOAP requests for data, then parse, normalize, and use XML data returned in SOAP responses. Conversely, applications such as databases can receive SOAP requests, formulate SOAP responses containing XML data, then serialize and transmit the SOAP response to the requesting client application.

XML was designed to be human readable. As a result, some features of XML are directed to enhance readability, rather than to optimize data integrity in data exchange. For example, to aid in readability, the XML specification describes the concept of "ignorable white space" and defines mandatory white space normalization rules for standards-based XML parsers so that an XML document can be formatted in an easily readable way without changing the meaning of the XML. Unfortunately when XML is being used simply as a way of transporting data to or from data sources where the white space is important to the meaning of the data, XML's treatment of white space can modify the white spaces in the data and thus corrupt the data.

With the rise in the exchange of XML data, there is a need in the industry to prevent corruption of XML data as it is passed between different computing environments.

SUMMARY

In consideration of the above-identified need to prevent XML data corruption, the invention provides safeguards from corruption resulting from XML data normalization and removal of "ignorable" white space. Normalization involves, for example, removal of white space such as carriage returns and carriage return/line feed combinations, which are normalized to simple line feeds, and removal of tabs and end-of-line characters appearing in attribute values, which are normalized to spaces. Furthermore, XML parsers may remove "ignorable white space." Removal and/or modification of such white space in XML data retrieved from a database or other data storage location may amount to data corruption. Safeguards provided herein protect XML data from such corruption due to normalization and removal of "ignorable" white space when formulating a request to or response from a database or other data storage location. Other advantages and features of the invention are described below.

BRIEF DESCRIPTION OF THE DRAWINGS

The systems and methods for prevention of data corruption in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview

A number of embodiments of the invention are set forth below. First, techniques are provided for avoiding element and attribute normalization generally when using a markup language as a data exchange format. Such techniques can be applied in many settings and are not specific to XML fragments. Next, embodiments are provided that address white space problems when exchanging XML fragments. XML fragments present additional white space problems because of the concept of "ignorable white space" and the fact that XML fragments cannot describe their own root level white space handling rules inline. We solve this problem either by using the same mechanisms used in the general case, or by using an alternate solution.

The alternate solution generally comprises three parts: 1. Strip out ignorable white space from the XML fragment while it still is embedded in the document and has associated white space handling rules. 2. In the server, parse stand-alone XML fragments as if the xml:space attribute has been set to "preserve" above the root level, and 3. When embedding an XML fragment in other XML, we ensure that the white space preserve semantics are described appropriately in the containing XML by adding an xml:space="preserve" attribute to the immediate container node or any node in the XML hierarchy containing the fragment, so long as there is no xml:space="default" attribute lower in the hierarchy.

Avoiding Element and Attribute Normalization Generally

All XML parsers that conform to the XML specifications must follow certain data normalization rules. For example, XML parsers must modify white space under certain circumstances. In XML element character data, end-of-line characters (carriage-returns (0x0D), line-feeds (0x0A), and carriage-return/line-feed combinations (0x0D0A)) must be normalized to simple line-feeds (0x0A). XML attribute values have additional normalization rules imposed on them by the XML specifications. After end-of-line normalization, all end-of-line characters and tabs (0x09) are normalized to spaces (0x20). In this regard, exemplary portions of sections 2.11 and 3.3.3 from the XML 1.0 Recommendation (Third Edition) are set forth below:

Begin quote from *XML* 1.0 *Recommendation* (*Third Edition*):

2.11 End-of-Line Handling

XML parsed entities are often stored in computer files which, for editing convenience, are organized into lines. These lines are typically separated by some combination of the characters CARRIAGE RETURN (#xD) and LINE FEED (#xA).

To simplify the tasks of applications, the XML processor MUST behave as if it normalized all line breaks in external parsed entities (including the document entity) on input, before parsing, by translating both the two-character sequence #xD #xA and any #xD that is not followed by #xA to a single #xA character.

3.3.3 Attribute-Value Normalization

Before the value of an attribute is passed to the application or checked for validity, the XML processor MUST normalize the attribute value by applying the algorithm below, or by using some other method such that the value passed to the application is the same as that produced by the algorithm.

All line breaks MUST have been normalized on input to #xA as described in 2.11 End-of-Line Handling, so the rest of this algorithm operates on text normalized in this way.

Begin with a normalized value consisting of the empty string.

For each character, entity reference, or character reference in the unnormalized attribute value, beginning with the first and continuing to the last, do the following:

For a character reference, append the referenced character to the normalized value.

For an entity reference, recursively apply step 3 of this algorithm to the replacement text of the entity.

For a white space character (#x20, #xD, #xA, #x9), append a space character (#x20) to the normalized value.

For another character, append the character to the normalized value.

If the attribute type is not CDATA, then the XML processor MUST further process the normalized attribute value by discarding any leading and trailing space (#x20) characters, and by replacing sequences of space (#x20) characters by a single space (#x20) character.

Note that if the unnormalized attribute value contains a character reference to a white space character other than space (#x20), the normalized value contains the referenced character itself (#xD, #xA or #x9). This contrasts with the case where the unnormalized value contains a white space character (not a reference), which is replaced with a space character (#x20) in the normalized value and also contrasts with the case where the unnormalized value contains an entity reference whose replacement text contains a white space character; being recursively processed, the white space character is replaced with a space character (#x20) in the normalized value.

End quote from *XML* 1.0 *Recommendation* (*Third Edition*).

Sections 2.11 and 3.3.3, above, are two examples of features of the XML specifications that are problematic for ensuring that data is preserved without corruption on a round-trip from a database server. XML processors conduct normalization of data with the intention of ensuring that data remains human-readable, but unfortunately this can alter the data. To ensure the integrity of data that is returned from a database, the fact that XML happens to be used as a transport for data, as with the SOAP protocol, should not affect the actual contents of that data.

Figure 1:
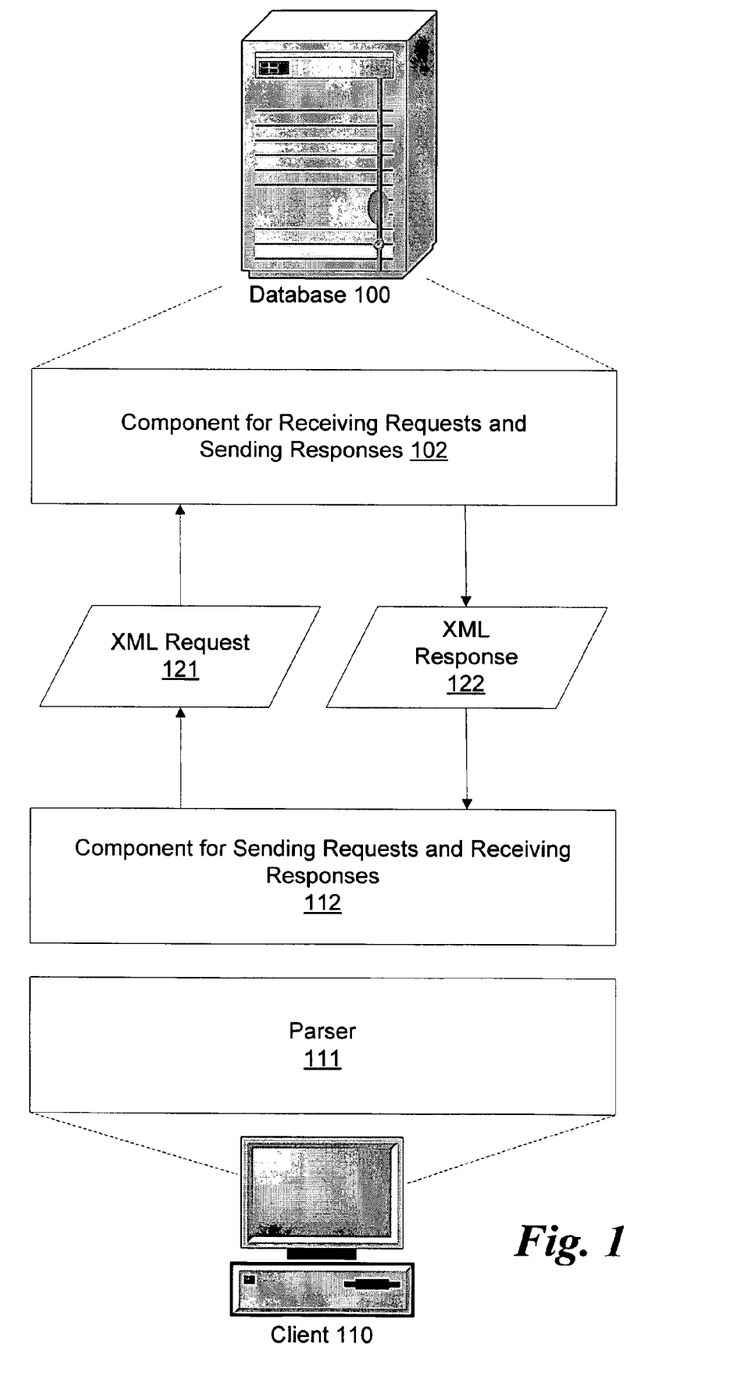
FIG. 1 illustrates an arrangement wherein a client can request data from a database. The data may be delivered as XML, and parsed by a client side parser.

FIG. 1. illustrates an arrangement comprising a client 110 and database 100 that may experience a data corruption problem due to normalization by an XML parser 111. An application (not shown) on client 110 may request some data from the database 100. To make the request, the component for sending requests and receiving responses 112 may package a request 121 according to an appropriate transmission protocol, such as SOAP.

The request 121 will then be received by a component for receiving requests and sending responses 102. The database 100 will retrieve the requested data. The data may be packaged into a response 122, such as a SOAP response. The response may then be serialized and delivered back to the client 110. Note that database 100 is depicted in FIG. 1 as a standalone computer. This is for ease of illustration only. It will be acknowledged that database 100 comprises a software application that can execute at any location, or in a distributed computing arrangement. Database 100 may, in some embodiments, be replaced with any data storage or delivery means, even if not formally considered to be a "database" as that term is understood by those of skill in the art. For example, database 100 could be a web service that returns calculated rather than stored data.

Upon arrival of the response 122 at component 112, the response may be normalized by parser 111 and given to the requesting application. As part of normalization, the data in the response may be altered, for example by normalizing end of line characters as required by the XML specification sections cited above. Under some circumstances, such normalization would corrupt the data. For example, imagine a hypothetical spreadsheet application, such as MICROSOFT EXCEL® at client 110. If a carriage return is removed from response 122 by parser 111 prior to delivery of the XML fragment to the spreadsheet application, the application might omit some empty cells in a spreadsheet that were required to show the appropriate relationships between data in a spreadsheet document.

To avoid the problem illustrated in FIG. 1, techniques can be used to ensure that normalization at parser 111 does not corrupt data in the response 122. In one embodiment, these techniques can be applied at the server 100, as part of formulating the response. In general, the techniques can leverage "escaping" or "entitization" possibilities built into the XML specifications. Escaping, as the term is used here, refers to avoiding changes to data that would otherwise occur during normalization by an XML processor. Several exemplary techniques for escaping normalization of XML data by parser 111 are described in detail herein.

Figure 2:
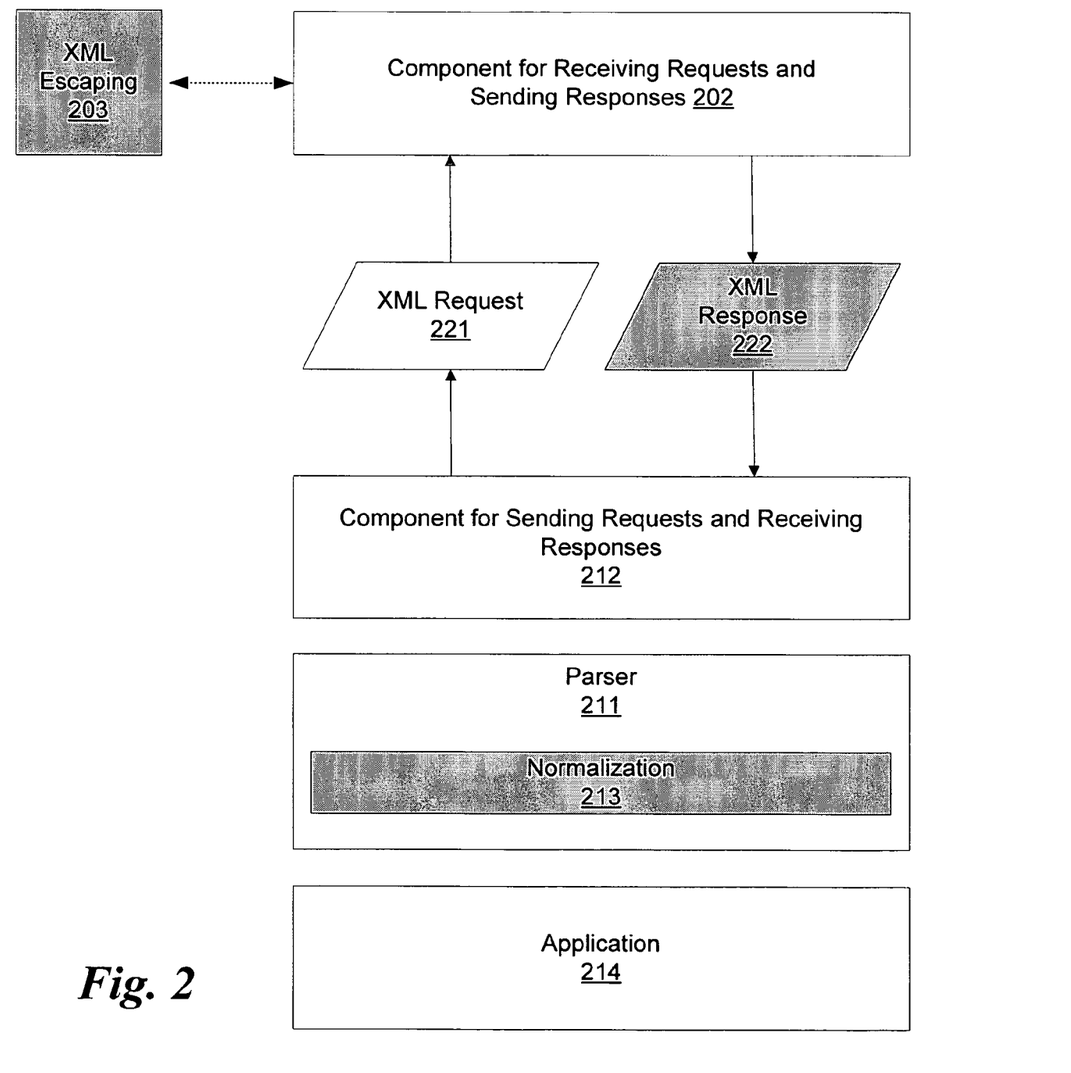
FIG. 2 illustrates XML escaping functionality that may be involved in generating responses, and which ensures that data in a response is corruption-proof by altering the XML data so that white space will not be lost when it is normalized.

The solutions provided herein can be generally understood with reference to FIG. 2. FIG. 2 presents an arrangement of components 202, 212, and 211 similar to those of FIG. 1. FIG. 2 also demonstrates that the component for receiving requests and sending responses 202 may operate in conjunction with XML escaping functionality 203 that checks and configures response 222 to ensure that normalization 213 functions of parser 211 will not corrupt the data in response 222. The usage of various escaping techniques by XML escaping functionality 203 is described in detail herein. Note that while XML escaping functionality 203 is depicted here as interoperating with component 202, there may be other arrangements in which XML escaping 203 occurs at other points in the data pipeline. Such alternative arrangements will be recognized by those of skill as within the scope and spirit of the invention.

Figure 3:
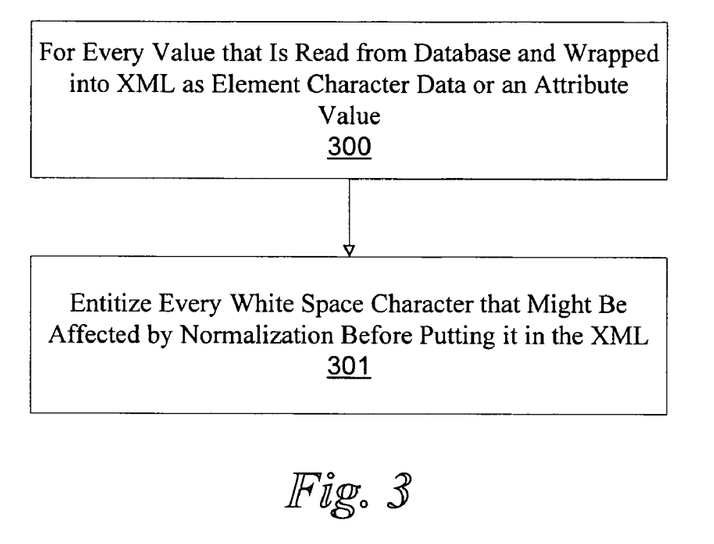
FIG. 3 illustrates a method for safeguarding against normalization of white space that includes entitizing white space characters.

FIG. 3 demonstrates a method for entitizing all appropriate white space by determining based on each value wrapped into XML as element or attribute 300 whether the value is white space that could be affected by normalization as defined by the applicable XML specification. Such white space is entitized 501.

Figure 4:
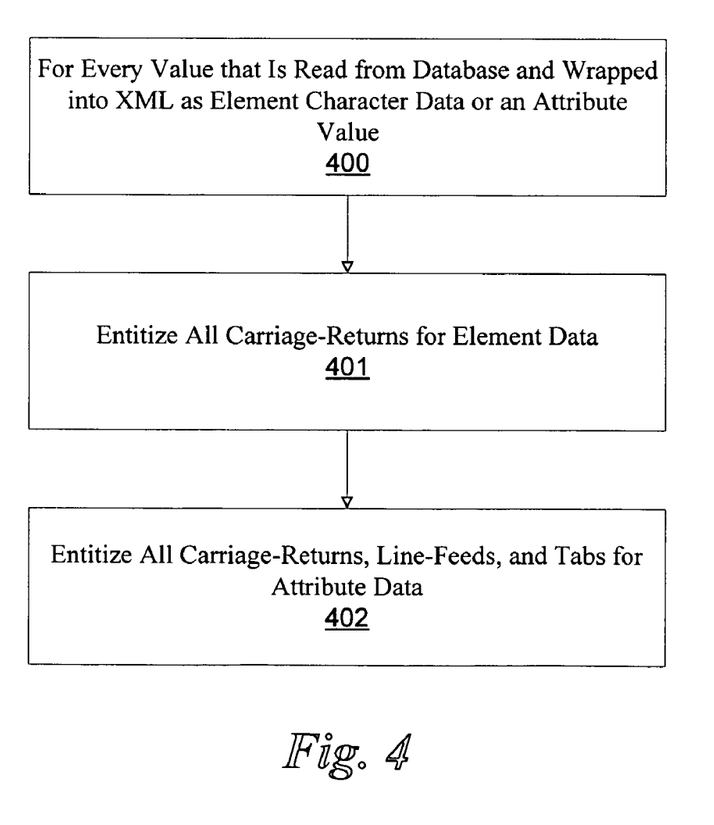
FIG. 4 illustrates a more specific implementation of FIG. 3, in which carriage returns are entitized in element data, and carriage returns, line feeds, and tabs are entitized for attribute data.

FIG. 4 illustrates a more specific implementation of the process illustrated in FIG. 3. FIG. 4 is based on the rules of the present XML specifications, namely XML 1.0 (Third Edition) and XML 1.1. As illustrated in FIG. 4, for every value that is read from the database and wrapped into XML as element character data or an attribute value 400, all carriage-returns are entitized for element data 401, and all carriage-returns, line-feeds, and tabs are entitized for attribute data 402. In this way, even if a client XML parser reads out the XML data, the white space characters will be preserved and the user will see the data as it actually exists in the database.

In an alternative arrangement, a Character Data (CDATA) node may be used rather than using entitization as a way of indicating that white-space should not be normalized. A CDATA section is a section in an XML document which is marked for a parser to interpret as character data and not markup.

Characters which are entitized and/or placed in a CDATA section are not subject to normalization by an XML parser. This allows users to enter data into a database by entitizing the white space characters or wrapping them in a CDATA section. In one embodiment, as illustrated in FIG. 3, for every value that is read from the database and wrapped into XML as element character data or an attribute value 300, every white space character that might be affected by normalization can always be entitized before putting it in XML 301.

Preserving Data in XML Fragments

An XML fragment may be defined as a self-contained portion of an XML document that is less than the entire XML document. An XML document begins in a "root" or document entity. Logically, the document is composed of declarations, elements, comments, character references, and processing instructions, all of which are indicated in the document by explicit markup. With the rising use of XML in databases, XML fragments are increasingly transmitted between applications instead of entire documents.

XML fragments can be pulled out of one XML document and used alone, or embedded in another XML document. When XML is passed around in this fashion, certain features of the XML specifications, especially those that are directed to passing data in a human readable format, become problematic. One set of problematic features are those directed towards removal of ignorable white space. XML documents specify white space handling rules for themselves, and a fragment may not contain any reference to, or reiteration of, such white space rules.

Section 2.10 from the XML 1.0 Recommendation (Third Edition) addresses rules by which white space can be determined as significant or "ignorable" in an XML document:

Begin quote from *XML* 1.0 *Recommendation* (*Third Edition*):

2.10 White Space Handling

In editing XML documents, it is often convenient to use "white space" (spaces, tabs, and blank lines) to set apart the markup for greater readability. Such white space is typically not intended for inclusion in the delivered version of the document. On the other hand, "significant" white space that should be preserved in the delivered version is common, for example in poetry and source code.

An XML processor MUST always pass all characters in a document that are not markup through to the application. A validating XML processor MUST also inform the application which of these characters constitute white space appearing in element content.

A special attribute named xml: space MAY be attached to an element to signal an intention that in that element, white space should be preserved by applications. In valid documents, this attribute, like any other, MUST be declared if it is used. When declared, it MUST be given as an enumerated type whose values are one or both of "default" and "preserve". For example:

```
<!ATTLIST poem xml:space (default|preserve) 'preserve'>
<!ATTLIST pre xml:space (preserve) #FIXED 'preserve'>
```

The value "default" signals that applications' default white-space processing modes are acceptable for this element; the value "preserve" indicates the intent that applications preserve all the white space. This declared intent is considered to apply to all elements within the content of the element where it is specified, unless overridden with another instance of the xml:space attribute. This specification does not give meaning to any value of xml:space other than "default" and "preserve". It is an error for other values to be specified; the XML processor MAY report the error or MAY recover by ignoring the attribute specification or by reporting the (erroneous) value to the application. Applications may ignore or reject erroneous values.

The root element of any document is considered to have signaled no intentions as regards application space handling, unless it provides a value for this attribute or the attribute is declared with a default value.

End quote from *XML 1.0 Recommendation (Third Edition)*.

Thus, in addition to data normalization requirements, the XML specifications have definitions of what is considered "ignorable white space". Many XML parsers will throw away any white space considered ignorable. For example, any character data which consists of nothing but white space is considered ignorable unless a parent node has an "xml:space" attribute set to "preserve," or a Document Type Definition ("DTD") is present which defines different white space processing rules.

Note that the above Section 2.10 does not address preservation of white space in a fragment. Even if the parent node of the XML document specifies that all white space should be preserved, there is nothing in the XML fragment itself to specify the white space processing rules on its root level white space. Similarly, even if a SOAP document requests all of the white space in the fragment be preserved, once the fragment has been pulled out of the SOAP document, there is nothing in the fragment itself that will indicate this. White-space in the XML fragment marked for preservation by a containing XML document (e.g. a SOAP container with XML fragment inside) would be considered ignorable by subsequent parsers looking at the XML fragment "out of context." Thus, data corruption in exchange of XML fragments is likely.

Embodiments of a solution to this problem proposed herein may comprise three parts, as explained above in the overview section: 1. Strip out ignorable white space from the XML fragment while it still is embedded in the document and has associated white space handling rules. 2. In the server, parse stand-alone XML fragments as if the xml:space attribute has been set to "preserve" above the root level, and 3. When embedding an XML fragment in other XML, we ensure that the white space preserve semantics are described appropriately in the containing XML by adding an xml:space="preserve" attribute to the immediate container node or any node in the XML hierarchy containing the fragment, so long as there is no xml:space="default" attribute lower in the hierarchy.

Figure 5:
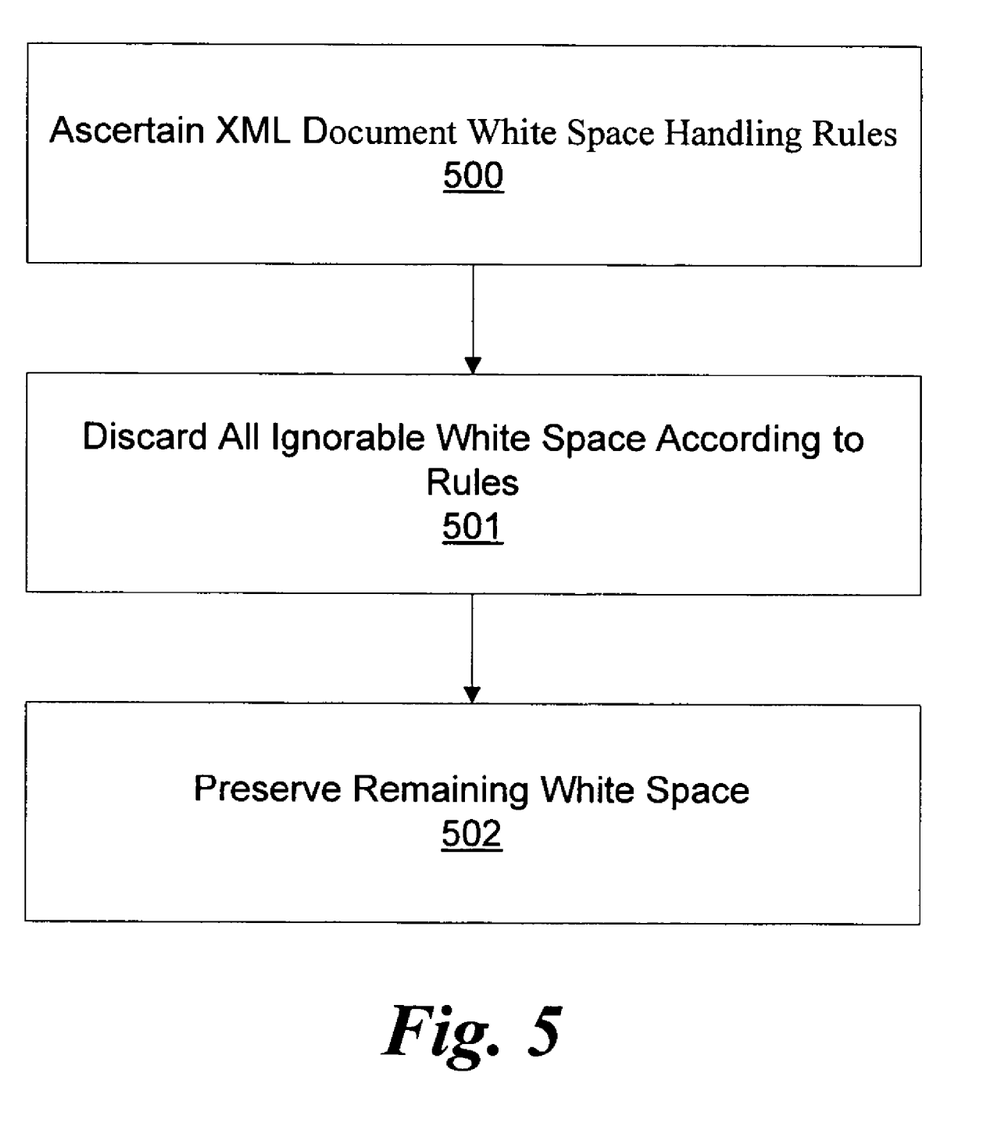
FIG. 5 illustrates a method for safeguarding against removal of "ignorable" white space that ensures white space preservation rules on a document are honored in XML fragments pulled from the document.

An exemplary sequence of steps for preserving white space by default for XML fragments is illustrated in FIG. 5. When we pull an XML fragment out of an XML document, we ascertain the document's white space handling rules 500, and discard any ignorable white space 501. An example of a document white space handling rule is whether the document has any xml:space attributes set to either "preserve" or "default."

Once the XML fragment has been pulled from the XML document in this manner, all remaining white space can be considered significant. This means that subsequent attempts to parse the fragment should preserve white space. White space can be preserved 502 in a number of ways. A technique for ensuring that parsers of a standalone fragment preserve all white space comprise entitizing white space in the fragment, or wrapping the white space and character data within the fragment in a CDATA section when the fragment is stored, as described above. Another option is to ensure that all parsers operating on the fragment are configured to preserve white space automatically. As there are no XML specifications regarding the parsing of XML fragments, requiring that parsers of standalone XML fragments preserve white space by default is reasonable.

Anytime an XML fragment is reinserted in an XML document, we must continue to preserve the white space. Techniques for preserving white space can be those described in the above section regarding the normalization of white space, namely, entitizing all white space in the fragment or wrapping the fragment in a CDATA section.

Figure 6:
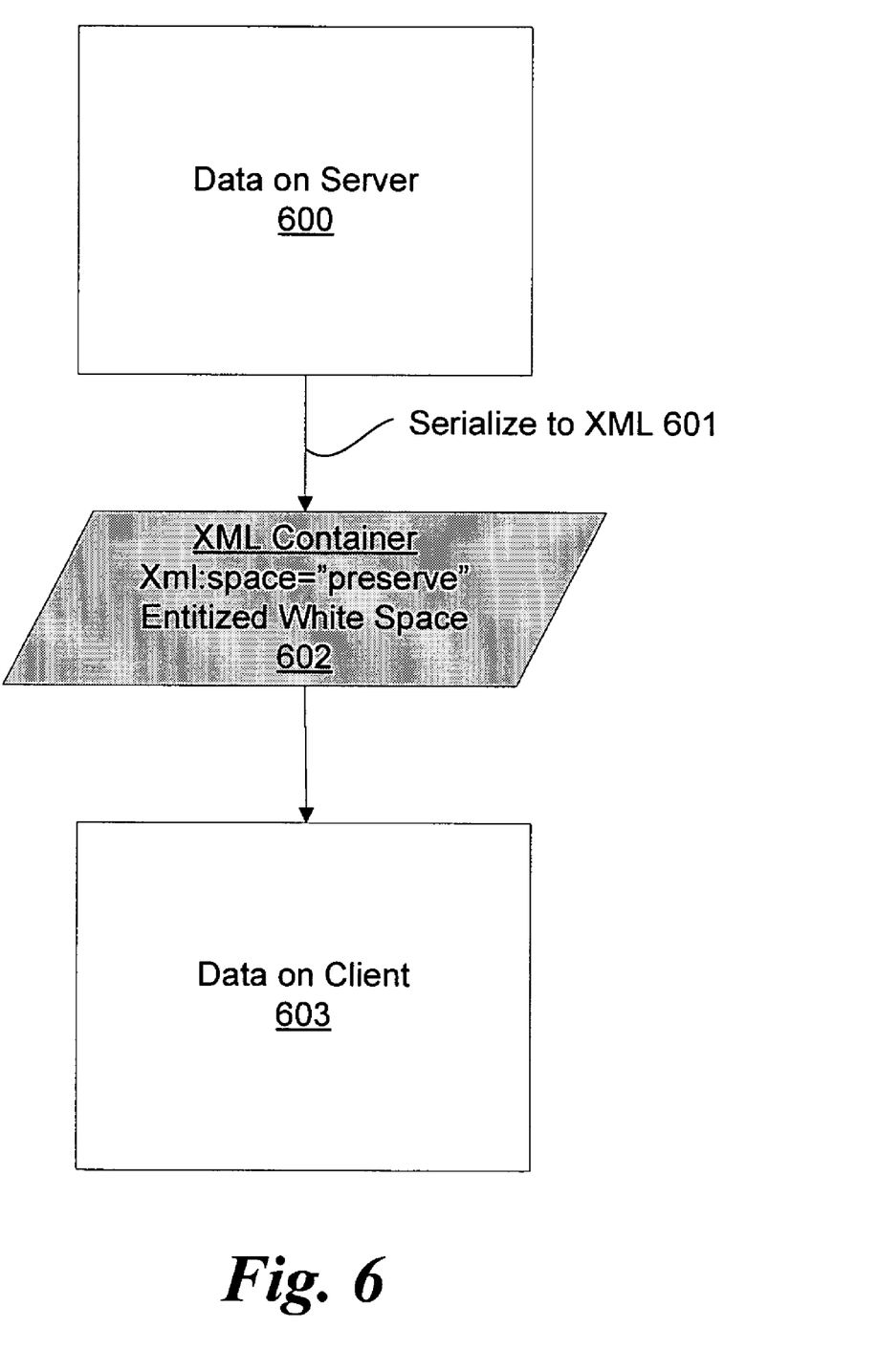
FIG. 6 illustrates a view of the invention in which data on a server is transmitted as XML to be integrated with data on a client. When the server serializes data to XML, techniques can be used to safeguard against client side data corruption through "ignorable" white space removal.

Another approach for preserving white space in a fragment inserted into an XML document 502 (see also 602) comprises setting the "xml:space" attribute to "preserve" in the containing XML document, e.g. a SOAP request or response. In one embodiment, the attribute may be included in the SOAP container for the data being transmitted. Note that if the ignorable white space is not first stripped out in accordance with step 501, then adding an xml:space="preserve" attribute may add white space to the data, which can result in data corruption.

When the "xml:space" attribute is set to "preserve" in an XML document, it can be placed on the node immediately containing the XML fragment. It could also be placed higher in the node hierarchy, however, it is possible that another "xml:space" attribute exists, and is set to "default" on some other node in the hierarchy This can create a problem because it would override the preserve setting we were intending to set.

FIG. 6 provides another illustration of techniques for embedding standalone XML fragments into subsequent XML documents. When exchanging data using an XML based communications protocol such as SOAP, data on a server 600 can be serialized into XML 601, comprising placing the data in a container 602 for transmission across a wire to a client. The XML data in the container 602 can be assimilated into data on client 603. If 600 and 603 are both databases or other applications that require strong data accuracy, there is a need to prevent data corruption removal of "ignorable" white space in XML data in the container 602 by a client side parser.

As explained above, FIG. 6 demonstrates an aspect of the invention particular to XML fragments and ignorable white space. FIG. 6 indicates two of the exemplary techniques described above that may be used to prevent data corruption from discarding "ignorable" white space. First, when serializing XML to a container 602, such as a SOAP container for transmission, an attribute may be set for the container 602, or within the data itself, that requires preservation of white space. This can be accomplished by setting the xml:space attribute to "preserve." Second, white space in the container may be "entitized", thereby removing risk that it will be removed by a parser. The white space and character data within the fragment may also be wrapped in a CDATA section as described above. The term "entitize" as used herein refers to providing appropriate XML syntax to make some XML data into an entity, and thereby avoid operation of default XML parser operations, such as those operations that remove white space.

In an alternative arrangement, a Character Data (CDATA) node may be used rather than using entitization as a way of indicating that white-space should not be normalized. A CDATA section is a section in an XML document which is marked for a parser to interpret as character data and not markup. A CDATA section starts with the following sequence:

```
<! [CDATA[
and ends with the first occurrence of the sequence:
]]>
```

All characters enclosed between these two sequences are interpreted as characters, not markup or entity references. CDATA is thus an XML construct which pre-empts normalization in the same way that entitization does. CDATA could be used in place of entitization to address both the normalization and the XML fragment issues presented herein.

In summary, data corruption may be avoided using white space preservation semantics on XML fragments. This can be done by explicitly defining white space preservation semantics for XML fragments pulled out of an XML document. Within a server, root level white space in XML fragments may be treated as significant and "non-ignorable" in order to prevent data corruption.

Data corruption may further be avoided by white space escaping in attribute and element data. The XML specifications define the algorithm for element and attribute value white space normalization and state when entitized white space values will not be normalized. A database product can leverage these features by entitizing white space characters before packaging them in XML, thereby avoiding this type of data corruption.

A computer program listing appendix is provided at the end of this specification which gives exemplary SOAP requests and responses which demonstrate operation of aspects of the invention. The following brief description is directed to explaining the features illustrated in the appendix.

With respect to white space preservation semantics on XML fragments, when an XML fragment is pulled out of an XML document, the document's white space handling rules can be used to throw out any ignorable white space, as described above. Any time the XML fragment is subsequently parsed in the server, by default white space should be preserved. When embedding the XML fragment back in an XML document to send back as a SOAP response, the SOAP response should indicate that white space should be preserved in the XML fragment.

The above aspects of the invention are illustrated in Exemplary SOAP Request #1, Example SOAP Response #1 (white space formatted for readability), and Example SOAP Response #1 (Raw output, no special white space formatting) as provided in the appendix. Several characteristics of these sections of the appendix are explained in sections 1(a)-1(i) below.

1(a) The SOAP request passes in seven parameters containing identical XML fragments to the server. Each of them contains the value "<foo> </foo>" (note the leading, embedded, and trailing "ignorable" white space). Several of the parameter container nodes specify xml:space="preserve", and several of them specify xml:space="default". Additionally some of the actual contained XML fragments override the xml:space setting for the "foo" node.

1(b) The SOAP response returned from SQL Server specifies xml:space="preserve" on the root node and does not contain any ignorable white space. Note that for purposes of readability, two examples have been provided, one with nice white space formatting and one that is the raw output. Even on the nicely formatted example, the white space in the Value nodes of the parameters was not modified.

1(c) The parameter "preserve", which had a preserve tag on the container node, preserved all white space in the fragment.

1(d) The parameter "default", which had a default tag on the container node, stripped out all ignorable white space in the fragment.

1(e) The parameter "preservepreserve", which had a preserve tag on the container node and the foo node, preserved all white space in the fragment.

1(f) The parameter "preservedefault", which had a preserve tag on the container node and a default tag on the foo node, preserved the root level white space but stripped out the ignorable white space in foo node.

1(g) The parameter "defaultpreserve", which had a default tag on the container node and a preserve tag on the foo node, stripped out the ignorable root level white space but preserved the white space in foo node.

1(h) The parameter "defaultdefault", which had a default tag on the container node and the foo node, stripped out all ignorable white space in the fragment.

1(i) The parameter "none", which had no xml:space tags but instead relied on the default preservation semantics, stripped out all ignorable white space in the fragment.

With respect to white space escaping in attribute and element data, as explained above, users can enter data into the database without any XML normalization by entitizing the white space characters. In an embodiment of the invention, for every value that is read from the database and wrapped into XML as element character data or an attribute value, the database may always entitize every white space character that might be affected by normalization before putting it in the XML. According to present XML specifications, this includes all carriage-returns for element data, and all carriage-returns, line-feeds, and tabs for attribute data. In this way, even if a client XML parser reads out the data, the white space characters will be preserved and the user will see the data as it actually exists in the database.

Note that in the above contemplated embodiment, if a client does not entitize data when it is entered into the database, the data may be normalized before it is entered into the database. When this data is returned, assuming that element values are requested, it will come back without any special entitization because none will be necessary, as the data has already been normalized. Embodiments which preserve some white space information prior to database-side parsing are also feasible.

The above aspects of the invention are illustrated in Exemplary SOAP Request #2 and Example SOAP Response #2 as provided in the appendix. Several characteristics of these sections of the appendix are explained in sections 2(a)-2(e) below.

2(a) The value passed in here consists of the sequence:
2 spaces, 2 tabs,
2 spaces, 2 line-feeds,
2 spaces, 2 carriage-return line-feed combinations,
2 spaces, 2 carriage-returns 2(b) Note that the carriage-returns must be escaped on the input otherwise the server-side XML normalization would have converted them all to simple line-feeds.

2(c) The xml:space="preserve" is not strictly necessary in this example because there is non-ignorable white space in this value in the form of the explicitly entitized carriage-returns. If the carriage-returns were not present and the xml:space="preserve" attribute was not specified, all of this white space would have been thrown out by the server-side XML parser as ignorable white space.

2(d) The value coming back in an attribute value has all of the spaces, carriage-returns, and line-feeds entitized as "	", "", and "
", respectively.

2(e) The value coming back in an element value has all of the carriage-return characters entitized as "".

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user corruption prevention techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations. Therefore, the present invention should not be limited to any single embodiment, but rather should be construed in breadth and scope in accordance with the appended claims.

COMPUTER PROGRAM LISTING APPENDIX

Example SOAP Request #1:

```
<?xml version="1.0" ?>
<SOAP-ENV:Envelope xmlns:SOAP-ENV="http://schemas.xmlsoap.org/soap/envelope/"
xmlns:sql="http://schemas.microsoft.com/sqlserver/2004/SOAP">
   <SOAP-ENV:Body>
      <sql:sqlbatch>
         <sql:BatchCommands>
         </sql:BatchCommands>
         <sql:Parameters
xmlns:sqlparam="http://schemas.microsoft.com/sqlserver/2004/SOAP/types/SqlParameter"
xmlns:p="http://schemas.microsott.com/sqlserver/2004/SOAP/Options"
xmlns:xsi="http://www.w3.org/2001/XMLSchema-instance"
xmlns:xsd="http://www.w3.org/2001/XMLSchema"
xmlns:sqltypes="http://schemas.microsoft.com/sqlserver/2004/sqltypes">(See 1(a))
            <sqlparam:SqlParameter name="preserve" sqlDbType="Xml" direction="InputOutput"
maxLength="100">
               <sqlparam:Value xsi:type="xsd:anyType" xml:space="preserve"> <foo> </foo>
</sqlparam:Value>
            </sqlparam:SqlParameter>
            <sqlparam:SqlParameter name="detault" sqlDbType="Xml" direction="InputOutput"
maxLength="100">
               <sqlparam:Value xsi:type="xsd:anyType" xml:space="default"> <foo> </foo>
</sqlparam:Value>
            </sqlparam:SqlParameter>
            <sqlparam:SqlParameter name="preservepreserve" sqlDbType="Xml"
direction="InputOutput" maxLength="100">
               <sqlparam:Value xsi:type="xsd:anyType" xml:space="preserve"> <foo
xml:space="preserve"> </foo> </sqlparam:Value>
            </sqlparam:SqlParameter>
            <sqlparam:SqlParameter name="preservedefault" sqlDbType="Xml"
direction="InputOutput" maxLength="100">
               <sqlparam:Value xsi:type="xsd:anyType" xml:space="preserve"> <foo
xml:space="default"> </foo> </sqlparam:Value>
            </sqlparam:SqlParameter>
            <sqlparam:SqlParameter name="defaultpreserve" sqlDbType="Xml"
direction="InputOutput" maxLength="100">
               <sqlparam:Value xsi:type="xsd:anyType" xml:space="default"> <foo
xml:space="preserve"> </foo> </sqlparam:Value>
            </sqlparam:SqlParameter>
            <sqlparam:SqlParameter name="defaultdefault" sqlDbType="Xml"
direction="InputOutput" maxLength="100">
               <sqlparam:Value xsi:type="xsd:anyType" xml:space="default"> <foo
xml:space="default"> </foo> </sqlparam:Value>
            </sqlparam:SqlParameter>
            <sqlparam:SqlParameter name="none" sqlDbType="Xml" direction="InputOutput"
maxLength="100">
               <sqlparam:Value xsi:type="xsd:anyType"> <foo> </foo> </sqlparam:Value>
            </sqlparam:SqlParameter>
         </sql:Parameters>
      </sql:sqlbatch>
   </SOAP-ENV:Body>
</SOAP-ENV:Envelope>
```

Example SOAP Response #1 (white space formatted for readability):

```
<?xml version="1.0" encoding="utf-8"?>
<SOAP-ENV:Envelope xml:space="preserve"(See 1(b))
xmlns:xsd="http://www.w3.org/2001/XMLSchema"
xmlns:xsi="http://www.w3.org/2001/XMLSchema-instance" xmlns:SOAP-
ENV="http://schemas.xmlsoap.org/soap/envelope/"
xmlns:sql="http://schemas.microsoft.com/sqlserver/2004/SOAP"
xmlns:sqlsoaptypes="http://schemas.microsofft.com/sqlserver/2004 /SOAP/types"
xmlns sqlrowcount="http://schemas.microsoft.com/sqlserver/2004/SOAP/types/SqlRowCount"
xmlns:sqlmessage="http://schemas.microsoft.com/sqlserver/2004/SOAP/types/SqlMessage"
xmlns:sqlresultstream="http://schemas.microsoft.com/sqlserver/2004/SOAP/types/SqlResult
Stream"
xmlns:sqltransaction="http://schemas.microsoft.com/sqlserver/2004/SOAP/types/SqlTransaction"
xmlns:sqltypes="http://schemas.microsoft.com/sqlserver/2004/sqltypes">
    <SOAP-ENV:Body>
      <sql:sqlbatchResponse>
         <sql:sqlbatchResult xmlns=""/>
         <sql:Parameters
xmlns:sqlparam="http://schemas.microsoft.com/sqlserver/2004/SOAP/types/SqlParameter">
           <sqlparam:SqlParameter name="preserve" sqlDbType="Xml"
direction="InputOutput">
              <sqlparam:Value xsi:type="xsd:anyType"> <foo xmlns=""> </foo>
</sqlparam:Value>(See 1(c))
           </sqlparam:SqlParameter>
           <sqlparam:SqlParameter name="default" sqlDbType="Xml" direction="InputOutput">
              <sqlparam:Value xsi:type="xsd:anyType"><foo xmlns=""/></sqlparam:Value>(see
1(d))
           </sqlparam:SqlParameter>
           <sqlparam:SqlParameter name="preservepreserve" sqlDbType="Xml"
direction="InputOutput">
              <sqlparam:Value xsi:type="xsd:anyType"> <foo xml:space="preserve" xmlns="">
</foo>    </sqlparam:Value>(See 1(e))
           </sqlparam:SqlParameter>
           <sqlparam:SqlParameter name="preservedefault" sqlDbType="Xml"
direction="InputOutput">
              <sqlparam:Value xsi:type="xsd:anyType"> <foo xml:space="default" xmlns=""/>
</sqlparam:Value>(See 1(f))
           </sqlparam:SqlParameter>
           <sqlparam:SqlParameter name="defaultpreserve" sqlDbType="Xml"
direction="InputOutput">
              <sqlparam:Value xsi:type="xsd:anyType"><foo xml:space="preserve" xmlns="">
</foo></sqlparam:Value>(See 1(g))
           </sqlparam:SqlParameter>
           <sqlparam:SqlParameter name="defaultdefault" sqlDbType="Xml"
direction="InputOutput">
              <sqlparam:Value xsi:type="xsd:anyType"><foo xml:space="default"
xmlns=""/></sqlparam:Value>(See 1(h))
           </sqlparam:SqlParameter>
           <sqlparam:SqlParameter name="none" sqlDbType="Xml" direction="InputOutput">
              <sqlparam:Value xsi:type="xsd:anyType"><foo xmlns=""/></sqlparam:Value>(See
1(i))
           </sqlparam:SqlParameter>
         </sql:Parameters>
      </sql:sqlbatchResponse>
   </SOAP-ENV:Body>
</SOAP-ENV:Envelope>
```

Example SOAP Response #1 (Raw output, no special white space formatting):

```
<?xml versian="1.0" encoding="utf-8"?><SOAP-ENV:Envelope xml:space="preserve"
xmlns:xsd="http://www.w3.org/2001/XMLSchema"
xmlns:xsi="http://www.w3.org/2001/XMLSchema-instance" xmlns:SOAP-
ENV="http://schemas.xmlsoap.org/soap/envelope/"
xmlns:sql="http://schemas.microsoft.com/sqlserver/2004/SOAP"
xmlns:sqlsoaptypes="http://schemas.microsoft.com/sqlserver/2004/SOAP/types"
xmlns:sqlrowcount="http://schemas.microsoft.com/sqlserver/2004/SOAP/types/sqlRowCount"
xmlns:sqlmessage="http://schemas.microsoft.com/sqlserver/2004/SOAP/types/sqlMessage"
xmlns:sqlresultstream="http://schemas.microsoft.com/sqlserver/2004/SOAP/types/sqlResultStream"
xmlns:sqltransaction="http://schemas.microsoft.com/sqlserver/2004/SOAP/types/sqlTransaction"
xmlns:sqltypes="http://schemas.microsoft.com/sqlserver/2004/sqltypes"><SOAP-
```

-continued

```
ENV:Body><sql:sqlbatchResponse><sql:sqlbatchResult xmlns=""/><sql:Parameters
xmlns:sqlparam="http://schemas.microsoft.com/sqlserver/2004 /SOAP/types/SqlParameter"><
sqlparam:SqlParameter name="preserve" sqlDbType="Xml"
direction="InputOutput"><sqlparam:Value xsi:type="xsd:anyType"> <foo xmlns="">
</foo> </sqlparam:Value></sqlparam:SqlParameter><sqlparam:SqlParameter name="default"
sqlDbType="Xml" direction="InputOutput"><sqlparam:Value xsi:type="xsd:anyType"><foo
xmlns=""/></sqlparam:Value></sqlparam:SqlParameter><sqlparam:SqlParameter
name="preservepreserve" sqlDbType="Xml" direction="InputOutput"><sqlparam:Value
xsi:type="xsd:anyType"> <foo xml:space="preserve" xmlns=""> </foo>
</sqlparam:Value></sqlparam:SqlParameter><sqlparam:SqlParameter name="preservedefault"
sqlDbType="Xml" direction="InputOutput"><sqlparam:Value xsi:type="xsd:anyType"> <foo
xml:space="default" xmlns=""/>
</sqlparam:Value></sqlparam:SqlParameter><sqlparam:SqlParameter name="defaultpreserve"
sqlDbType="Xml" direction="InputOutput"><sqlparam:Value xsi:type="xsd:anyType"><foo
xml:space="preserve" xmlns="">
</foo></sqlparam:Value></sqlparam:SqlParameter><sqlparam:SqlParameter
name="defaultdefault" sqlDbType="Xml" direction="InputOutput"><sqlparam:Value
xsi:type="xsd:anyType"><foo xml:space="default"
xmlns=""/></sqlparam:Value></sqlparam:SqlParameter><sqlparam:SqlParameter name="none"
sqlDbType="Xml" direction="InputOutput"><sqlparam:Value xsi:type="xsd:anyType"><foo
xmlns=""/></sqlparam:Value></sqlparam:SqlParameter></sql:parameters></sql:sqlbatchResponse
></SOAP-ENV:Body></SOAP-ENV:Envelope>
```

Example SOAP Request #2:

```
<?xml version="1.0" ?>
<SOAP-ENV:Envelope xmlns:SOAP-ENV="http://schemas.xmlsoap.org/soap/envelope/"
xmlns:sql="http://schemas.microsoft.com/sqlserver/2004/SOAP">
    <SOAP-ENV:Body>
      <sql:sqlbatch>
         <sql:BatchCommands>
select
  @nvch as nbch
  for xml raw
select
  @nvch as nbch
  for xml raw, elements
         </sql:BatchCommands>
         <sql:Parameters xmlns:bogus="bogus.namespace:"
xmlns:sqlparam="http://schemas.microsoft.com/sqlserver/2004/SOAP/types/SqlParameter"
xmlns:xsi="http://www.w3.org/2001/XMLSchema-instance">
           <sqlparam:SqlParameter xmlns:bogus="bogus.namespace:" maxLength="100"
name="nvch sqlDbType="NVarChar" direction="Input">
             <!-- Whitespace should be preserved:2spc, 2tab, 2spc, 2LF, 2spc, 2CRLF,
2spc, 2CR -->
             <sqlparam:Value xml:space="preserve" (See 2(c))>
  

    (See 2(b))</sqlparam:Value>(See 2(a))
           </sqlparam:SqlParameter>
         </sql:Parameters>
      </sql:sqlbatch>
   </SOAP-ENV:Body>
</SOAP-ENV:Envelope>
```

Example SOAP Response #2:

```
<?xml version="1.0" encoding="utf-8"?>
<SOAP-ENV:Envelope xml:space="preserve" xmlns:xsd="http://www.w3.org/2001/XMLSchema"
xmlns:xsi="http://www.w3.org/2001/XMLSchema-instance" xmlns:SOAP-
ENV="http://schemas.xmlsoap.org/soap/envelope/"
xmlns:sql="http://schemas.microsoft.com/sqlserver/2004/SOAP"
xmlns:sqlsoaptypes="http://schemas.microsoft.com/sqlserver/2004/SOAP/types"
xmlns:sqlrowcount="http://schemas.microsoft.com/sqlserver/2004/SOAP/types/sqlRowCount"
xmlns:sqlmessage="http://schemas.microsoft.com/sqlserver/2004/SOAP/types/sqlMessage"
xmlns:sqlresultstream="http://schemas.microsoft.com/sqlserver/2004/SOAP/types/SqlResult
Stream"
xmlns:sqltransaction="http://schemas.microsoft.com/sqlserver/2004/SOAP/types/SqlTransaction"
```

-continued

```
xmlns:sqltypes="http://schemas.micrasoft.com/sqlserver/2004/sqltypes">
  <SOAP-ENV:Body>
    <sql:sqlbatchResponse>
      <sql:sqlbatchResult xmlns="">
        <sqlresultstream:SqlXml xsi:type="sqlsoaptypes:SqlXml">
          <SqlXml>
            <row nbch=" 		 

 


"/> (See 2(d))
          </SqlXml>
        </sqlresultstream:SqlXml>
        <sqlresultstream:SqlRowCount xsi:type="sqlrowcount:SqlRowCount">
          <sqlrowcount:Count>1</sqlrowcount:Count>
        </sqlresultstream:SqlRowCount>
        <sqlresultstream:SqlXml xsi:type="sqlsoaptypes:SqlXml">
          <SqlXml>
            <row>
              <nbch>
   

   </nbch>(See 2(e))
            </row>
          </SqlXml>
        </sqlresultstream:SqlXml>
        <sqlresultstream:SqlRowCount xsi:type="sqlrowcount:SqlRowCount">
          <sqlrowcount:Count>1</sqlrowcount:Count>
        </sqlresultstream:SqlRowCount>
      </sql:sqlbatchResult>
    </sql:sqlbatchResponse>
  </SOAP-ENV:Body>
</SOAP-ENV:Envelope>
```

We claim:

1. A computer-implemented method for preserving integrity of data exchanged using Extensible Markup Language ("XML"), comprising:
   extracting an XML fragment from an XML document;
   ascertaining white space handling rules for the XML document associated with the XML fragment, wherein the white space handling rules are indicated in the XML document;
   discarding ignorable white space in the fragment, where ignorable white space is determined using said white space handling rules for the XML document;
   inserting the fragment into a SOAP ("Simple Object Access Protocol") document;
   in the SOAP document, entitizing all remaining white space associated with the fragment by:
   determining each of at least one white space data fragments in the remaining white space;
   for each of the at least one white space data fragments, inserting XML tag syntax into the SOAP document associated with the white space data fragment to cause an XML parser to treat the white space data fragment as an entity and thereby avoid removing the white space data fragment during a parsing operation; and
   transmitting the SOAP document to a receiving device, wherein the receiving device includes an XML parser for normalizing content in the SOAP document,
   wherein the white space handling rule is an xml:space attribute set to "preserve" or "default".

2. The method of claim 1, further comprising configuring an XML parser to preserve white space when the at least one fragment of said XML document is parsed.

3. The method of claim 1, further comprising serializing a datastream to generate the XML document.

4. The method of claim 1, wherein a CDATA) node that encapsulates a white space data fragment is inserted.

5. The method of claim 1, wherein said method is carried out by a database server.

6. The method of claim 1, wherein the xml:space "preserve" attribute is place in a node immediately containing the XML fragment.

7. The method of claim 1, the xml:space "preserve" attribute is placed in a node higher in a hierarchy than the node immediately containing the XML fragment.

8. A computer readable storage medium bearing instructions executed by a processor for preserving integrity of data exchanged using Extensible Markup Language (XML), comprising:
   extracting an XML fragment from an XML document;
   ascertaining white space handling rules for the XML document associated with the XML fragment, wherein the white space handling rules are indicated in the XML document;
   discarding ignorable white space in the fragment, where ignorable white space is determined using said white space handling rules for the XML document;
   inserting the fragment into a SOAP ("Simple Object Access Protocol") document;
   in the SOAP document, entitizing all remaining white space associated with the fragment by:
   determining each of at least one white space data fragments in the remaining white space;
   for each of the at least one white space data fragments, inserting XML tag syntax into the SOAP document associated with the white space data fragment to cause an XML parser to treat the white space data fragment as an entity and thereby avoid removing the white space data fragment during a parsing operation; and
   transmitting the SOAP document to a receiving device, wherein the receiving device includes an XML parser for normalizing content in the SOAP document,
   wherein the white space handling rule is an xml:space attribute set to "preserve" or "default".

9. The computer readable medium of claim 8, wherein the xml:space "preserve" attribute is place in a node immediately containing the XML fragment.

10. A system for preserving integrity of data exchanged using Extensible Markup Language ("XML"), comprising:
   a processor;
   a memory; and
   a database server executing on at least one computing device, wherein the database server is adapted to:
   extract an XML fragment from an XML document;
   ascertain white space handling rules for the XML document associated with the XML fragment, wherein the white space handling rules are indicated in the XML document;
   discard ignorable white space in the fragment, where ignorable white space is determined using said white space handling rules for the XML document;
   insert the fragment into a SOAP ("Simple Object Access Protocol") document;
   in the SOAP document, entitize all remaining white space associated with the fragment by:
   determining each of at least one white space data fragments in the remaining white space;
   for each of the at least one white space data fragments, inserting XML tag syntax into the SOAP document associated with the white space data fragment to cause an XML parser to treat the white space data fragment as an entity and thereby avoid removing the white space data fragment during a parsing operation; and
   transmit the SOAP document to a receiving device, wherein the receiving device includes an XML parser for normalizing content in the SOAP document,
   wherein the white space handling rule is an xml:space attribute set to "preserve" or "default".

11. The system of claim 10, wherein the XML parser is configured to preserve white space when the at least one fragment of said XML document is parsed.

* * * * *